United States Patent Office 3,345,263
Patented Oct. 3, 1967

3,345,263
DIURETIC COMPOUNDS AND METHOD OF PROMOTING DIURESIS
Anangur V. Subbaratnam, Chicago, Ill., assignor to Wilson & Co., Inc., a corporation of Delaware
No Drawing. Filed June 15, 1964, Ser. No. 375,355
9 Claims. (Cl. 167—65)

ABSTRACT OF THE DISCLOSURE

This application relates to novel substituted cinnamic acids and pharmacologically acceptable salts thereof which have a halogen at either the 3 position or 4 position or both, on the benzene ring of the acid. These compounds are diuretic agents.

---

This invention relates to therapeutic agents. More particularly, it relates to the compounds which are highly effective as diuretic agents. Still more particularly, the invention relates to a method of inducing or promoting a high rate of urine flow and electrolyte excretion by administration of pharmacologically active dosages of compounds falling in the category of derivatives of cinnamic acid.

In accordance with the present invention a compound or mixture of compounds selected from the class identifiable generally as halogen substituted cinnamic acids and the water-soluble salts formed by the use of pharmacologically acceptable cations, either alone or in combination with known diuretics or saluretics or pharmaceutically acceptable carrier is administered to induce increased flow of urine and electrolyte excretion with minimal side effects.

Diuretics are important pharmaceuticals and are used extensively to augment the output of waste fluids and thereby to produce a significant loss of body weight, to reduce or eliminate edema or other symptoms usually associated with hypertension and the retention of an excessive amount of sodium ions in the body.

The classical diuretics, Mercurials and Xanthenes have become restricted in use because it is now recognized that they are toxic upon acute or chronic administration. These compounds also cause side effects such as local inflammation, ecchymosis and plasma electrolyte imbalance.

In recent years, newer diuretics such as the substituted quinazolinones, acetazolamide, chlorthiazide, hydrochlorthiazide, have come into use. While such compounds do not have the side effects of the earlier diuretics, they do have disadvantages such as causing hypokalemia, hyperuricemia and metabolic acidosis. These disturbances of electrolyte balance are undesirable because they can result in listlessness, weakness, apathy and cardiac malfunction.

Another disadvantage of many of the diuretics currently in use is that they do not produce an increase in glomerular filtration rate or increase renal plasma flow as indicated by creatinine and para-amino-hippuric acid clearance rates, standard tests as described in Principles of Renal Physiology, Homer W. Smith (1956), New York; Oxford University Press, whereas both actions are desirable for fast, effective reduction in the quantities of water and salt which may be retained in the body tissues.

Now it has been discovered that compounds of the general formula

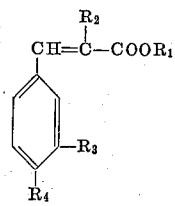

wherein $R_1$ represents a member selected from the group consisting of hydrogen, sodium, potassium, or other pharmacologically acceptable cation; $R_2$ represents a member selected from the group consisting of hydrogen, an alkyl radical having up to 3 carbon atoms, i.e., methyl, ethyl and n-propyl, isopropyl radicals, halogen radicals, phenyl radical, substituted phenyl radical and carboxyl radical; $R_3$ represents a member selected from the group consisting of hydrogen and halogen radical; $R_4$ represents a member selected from the group consisting of hydrogen and halogen radical, at least one of the substituents $R_3$ and $R_4$ always being a halogen radical, are effective non-toxic diuretics capable of inducing an increase in both glomerular filtration rate and renal plasma flow and may be administered alone or in combination with a pharmaceutically acceptable carrier, the proportions of which are determined by the solubility and chemical nature of the compound, the chosen route of administration, etc., to induce or promote diuresis in mammals without producing undesirable side effects and without loss of effectiveness upon prolonged administration.

Representative compounds useful for the purposes of this invention and falling within the generic structural formula indicated above are the free acids and water-soluble salts of nuclear substituted cinnamic acid, such as 3,4-dichloro cinnamic acid, 3-fluoro potassium cinnamate, 4-chloro potassium cinnamate, 4-bromo cinnamic acid, 3-bromo cinnamic acid, 3,4-dichloro-alpha-methyl cinnamic acid, 3,4-dichloro-alpha (-p-nitro phenyl) cinnamic acid, (cis and trans).

The preferred compounds for use as diuretics are the 3,4 dihalogen substituted cinnamic acids, of which, 3,4 dichloro cinnamic acid is a specific example.

In administering the compounds capable of inducing increased urine flow, such compounds may be administered orally in the form of tablets or capsules, which forms may have water soluble coatings such as the synthetic gum carboxymethylcellulose, gelatin, and the like, and may contain starch, milk sugar, etc., as diluents. They may be administered sublingually in the form of soluble troches, etc. They may also be administered parenterally, that is intramuscularly, intravenously, or subcutaneously. For parenteral administration, the compounds may be used in the form of a sterile solution containing other solutes, for example, enough saline or glucose to make the solution isotonic, or in solution, suspension or emulsion in liquid carriers such as vegetable oil.

A physician is best qualified to determine the dosage of the diuretic compounds of this invention which will be most suitable and it will vary with the form of administration, the particular compound chosen and the particular patient under treatment. It generally will be found that when the compounds are administered orally, larger quantities of the active agent will be required. Useful dosages for human beings generally will be found to fall in the range between about 250 milligrams and 1.5 grams per day, although higher or lower dosages may be prescribed for both humans and mammals and the dosages may be administered in several different dosage units.

The following examples are given by way of illustration and are not to be construed as limitations upon the invention as many variations are possible without departing from the scope and the spirit thereof.

*Example I*

3,4-dichloro cinnamic acid may be prepared as follows, the quantities set forth forth hereinafter being on a weight basis.

A closable container is provided with a stopper carrying a calcium chloride guard tube. 44 parts of 3,4-dichlorobenzaldehyde, 57.5 parts of malonic acid, 125 parts of pyridine and 3 parts of piperidine are introduced into the container. After storage for seven days at a temperature of approximately 20° C. (68° F.), the reaction mixture is heated on a steam bath to a temperature between 90° C. (194° F.) and 100° C. (212° F.) for 24 hours while maintaining reflux conditions. The heated, refluxed mixture is then cooled to room temperature and stored for approximately four days. The liquid contents of the container are then poured, while maintaining strong agitation, into 100 parts of CP concentrated hydrochloric acid.

3,4-dichloro cinnamic acid separates as a white precipitate which is recovered by filtration. The filter cake is purified by washing with 3% hydrochloric acid and then with water maintained at a temperature of approximately 10° C. (50° F.). Following washing, the filter cake is dissolved in warm 95% ethyl alcohol in a weight ratio of approximately 1:17. The alcohol solution is mixed with filter aids and filtered. The filtrate is then concentrated on a steam bath to approximately 50% of the original volume and then allowed to cool to approximately 10° C. (50° F.). The crystallizate is pure 3,4-dichloro cinnamic acid, M.P. 211° to 223° C. and is collected by filtration.

The potassium salt of 3,4-dichloro cinnamic acid is prepared by titrating a suspension of the 3,4-dichlorocinnamic acid in methyl alcohol in a weight ratio of approximately 1:10 with 5% aqueous solution of potassium hydroxide, using a glass electrode until a pH of 9.0 is indicated. The resulting solution is filtered and evaporated to dryness. The dried product consists of potassium salt of 3,4-dichloro cinnamic acid. It can be purified further by careful washing with dry methanol, filtration and drying.

*Example II*

3,4-dichloro cinnamic may also be prepared as follows, the quantities being set forth hereinafter on a weight basis:

50 parts of 3,4-dichlorobenzaldehyde, 82 parts of freshly fused sodium acetate, 200 parts of acetic anhydride and 3 parts of pyridine are heated under reflux for about six hours in an oil bath maintained at a temperature of approximately 160° C. (320° F.). The reactant mixture is then cooled to approximately room temperature 20° C. (68° F.) and poured into 300 parts of water made up to 800 parts with crushed ice.

3,4-dichloro cinnamic acid precipitates immediately from the solution. The precipitate is filtered and washed with water maintained at a temperature of approximately 10° C. (50° F.). The filter cake is dissolved in hot ethyl acetate in a weight ratio of approximately 1:15. The ethyl acetate solution is mixed with charcoal and filter aids and then filtered. The filtrate is concentrated on a steam bath to approximately 50% of the original volume and then allowed to cool to 10° C. (50° F.). The crystallizate is pure 3,4-dichloro cinnamic acid, M.P. 218 to 221.5° C. On thin layer chromatography the product is found to be substantially identical with that prepared in accordance with Example I.

*Example III*

A mixture consisting of 35 parts of 3,4-dichlorobenzaldehyde, 19 parts of freshly fused sodium propionate and 32 parts of propionic anhydride is heated to an internal temperature in the range between 130° C. and 135° C. (266° F. and 275° F.) for approximately 30 hours while maintaining reflux conditions. The reactant mixture is then cooled to approximately 20° C. (68° F.) and poured into approximately 100 parts of water made up to 350 parts with crushed ice. A white product precipitate from solution and is recovered by filtration. The filter cake is washed with water maintained at a temperature of approximately 10° C. (50° F.).

The washed precipitate is suspended in methyl alcohol in a weight raito of approximately 1:10 and the suspension titrated with 10% aqueous solution of potassium hydroxide using a glass electrode until a pH of 7.4 is indicated. The resulting solution is filtered and evaporated to a thick syrupy concentrate. Upon storage at room temperature, a crystallizate is harvested which is the potassium salt of 3,4-dichloro-alpha methyl cinnamic acid. Upon recrystallization from methyl alcohol, the reaction product is obtained as cream colored crystals having a melting point between 300° C. (572° F.) and 302° C. (575.6° F.).

*Example IV*

7 parts of 3,4-dichlorobenzaldehyde, 7 parts of para-nitro-phenylacetic acid, 4 parts of pyridine and 4 parts of acetic anhydride are heated under reflux at approximately 150° C. (302° F.) (bath temperature) for approximately 30 minutes. The reaction mixture is cooled to room temperature and diluted with 8 parts of CP concentrated hydrochloric acid and 20 parts of cold water. A fine precipitate which separates out of the aqueous acidic solution is recovered by extracting the solution with 300 parts of diethyl ether. The composite of ethereal solutions is washed twice with 100 parts of water maintained at a temperature of approximately 10° C. (50° F.) and the layers separated. The water washings are discarded.

The water washed ethereal solution is extracted four times in succession with 0.2% aqueous caustic soda solution using 250 parts of caustic solution for each extraction. The alkali extracted ethereal solution is then washed with water twice using 100 parts for each washing. The washings are added to the alkaline extracts of the ethereal solution. The combined aqueous alkaline solutions are acidified to pH 4.0 with acetic acid. The product, alpha-p-nitro-phenyl-trans-3,4-dichloro cinnamic acid separates as a yellow precipitate which is recovered by filtration. Upon recrystallization of this product from ethyl acetate, a product is obtained having a melting point in the range between 220° C. (428° F.) and 224° C. (435.2 F.).

The filtrate, obtained following separation of the yellow precipitate, upon acidification with concentrated hydrochloric acid to a pH of 1.8 gives a recoverable quantity of alpha-p-nitro phenyl cis-3,4-dichloro cinnamic acid of melting point in the range between 185° C. (365° F.) and 189° C. (372.2° F.).

Evaluation of the products of Examples I and III as a diuretic was made by the following test on a cat.

The potassium salt of 3,4-dichloro cinnamic acid was tested on a cat of 2.9 kilograms body weight. The cat was nembutal anesthetized and the bladder and the femoral veins cannulated. An infusion was made to produce a saline load of 20 ml. per kilogram of weight. 3,4-dichloro cinnamic acid (K salt) of Example I was dissolved in water and injected intravenously. Thereafter saline was added in amounts to continuously balance the urine output.

The result of testing the product of Example I is given in Table I and the analysis of the electrolyte excretion, $\mu$eq./min. is given in Table II.

TABLE I

| Period | Urine Flow (ml./hr.) | Urine Flow (ml./kg.) | Urine Flow Ratio |
|---|---|---|---|
| Control | 19.0 | 6.55 | 1.00 |
| 10 mg./kg. 3,4-dichloro cinnamic acid (K salt) | | | |
| Hour 1 | 35.0 | 12.1 | 1.85 |
| Hour 2 | 55.0 | 19.0 | 2.90 |
| 5 mg./kg. 3,4-dichloro cinnamic acid (K salt) | | | |
| Hour 3 | 106.0 | 36.6 | 5.60 |
| 5 mg./kg. 3,4-dichloro cinnamic acid (K salt) | | | |
| Hour 4 | 150.0 | 51.8 | 7.90 |
| 5 mg./kg. 3,4,-dichloro cinnamic acid (K salt) | | | |
| Hour 5 | 135.0 | 46.6 | 7.13 |

TABLE II

| | Electrolyte Excretion (μeq./min.) | | |
|---|---|---|---|
| | Na+ | K+ | Cl- |
| Control | 35.4 | 19.0 | 70.3 |
| Aliquot of Test | 105.8 | 24.0 | 192.4 |

Evaluation of the product of Example III as a diuretic was made by the following test on a cat.

The potassium salt of 3,4-dichloro-alpha methyl cinnamic acid was tested on a cat of 2.59 kilograms body weight. The cat was nembutal anesthetized and the bladder and the femoral veins cannulated. An infusion was made to produce a saline load of 20 ml. per kilogram of weight. The product of Example III was dissolved in water and injected intravenously. Thereafter saline was added in amounts to continuously balance the urine output.

The result of testing the product of Example III is given in Table III.

TABLE III

| Period | Urine Flow (ml./hr.) | Urine Flow (ml./kg.) | Urine Flow Ratio |
|---|---|---|---|
| Control | 4.5 | 1.74 | 1.00 |
| 5 mg./kg. 3,4-dichloro-alpha methyl cinnamic acid (K salt) | | | |
| Hour 1 | 4.5 | 1.74 | 1.00 |
| 5 mg./kg. 3,4-dichloro-alpha methyl cinnamic acid (K salt) | | | |
| Hour 2 | 5.0 | 1.93 | 1.11 |
| 5 mg./kg. 3,4-dichloro-alpha methyl cinnamic acid (K salt) | | | |
| Hour 3 | 8.0 | 3.08 | 1.77 |
| 5 mg./kg. 3,4-dichloro-alpha methyl cinnamic acid (K salt) | | | |
| Hour 4 | 17.5 | 6.75 | 3.88 |
| 5 mg./kg. 3,4-dichloro-alpha methyl cinnamic acid (K salt) | | | |
| Hour 5 | 46.0 | 17.8 | 10.2 |

The product of Example IV was tested with Holtzman male rats. The rats were tested in groups of four. An injection was made to produce a saline load of 20 ml. per kilogram of weight. The product of Example IV was suspended in oil and administered intramuscularly.

The result of testing the product of Example IV is given in Table IV.

TABLE IV

| Group | Urine Volume Per 5 Hrs. (ml.) | Urine Fow Ratio |
|---|---|---|
| Control A | 9.5 | 1.4 |
| Control B | 11.5 | 1.7 |
| Standard (hydrochlorothiazide) | 25.0 | 3.7 |
| 3,4-dichloro-alpha(-p-nitro phenyl)cinnamic acid | 18.0 | 2.7 |

Evaluation of the free acid, 3,4-dichloro cinnamic acid produced as an intermediate product in Example I as a diuretic was made by the following test on a dog of 12.3 kilograms body weight. The dog was tranquilized and a retention catheter inserted into the bladder. An infusion tube was then inserted into the foreleg vein. An infusion was made with a solution having 0.9% saline in 2.5% dextrose. The bladder emptied and liquid fed orally to produce a saline load of 20 ml. per kilogram of weight. The dog was then induced to swallow a capsule containing 300 mg. of 3,4-dichloro cinnamic acid.

The result of testing this free acid is given in Table V and the analysis of the electrolyte excretion, μeq./min. is given in Table VI.

TABLE V

Period— Urine Flow (ml.)
Control: 300 mg. 3,4-dichloro cinnamic acid
  or 25 mg./kg. oral capsule _____ 33.0
Hour 1: 300 mg. 3,4-dichloro cinnamic acid
  or 25 mg./kg. oral capsule _____ 43.5
Hour 2: 300 mg. 3,4-dichloro cinnamic acid
  or 25 mg./kg. oral capsule _____ 62.0
Hour 3: 300 mg. 3,4-dichloro cinnamic acid
  or 25 mg./kg. oral capsule _____ 46.0
Hour 4: 300 mg. 3,4-chloro cinnamic acid
  or 25 mg./kg. oral capsule _____ 61.5

TABLE VI

Electrolyte Excretion (μeq./min.)

| | Na+ | K+ | Cl- | HCO3- |
|---|---|---|---|---|
| Control | 53.9 | 36.3 | 67.6 | 1.10 |
| Hour 1 | 201.5 | 55.8 | 274.1 | 0.00 |
| Hour 2 | 152.9 | 30.0 | 103.3 | 0.00 |
| Hour 3 | 171.7 | 32.2 | 194.7 | 0.00 |
| Hour 4 | 202.9 | 32.8 | 226.5 | 0.00 |

While a detailed description of the method of preparing the diuretics of this invention, with some possible modifications, has been provided, it should be understood that numerous modifications may be affected without departing from the true spirit and scope of the concept of the invention.

I claim:

1. The method of promoting diuresis in mammals which comprises administering to said mammals pharmacologically active dosages of a compound selected from the group having the formula

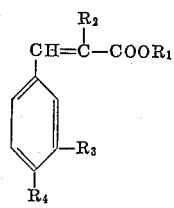

wherein $R_1$ represents a member selected from the group consisting of hydrogen, sodium and potassium; $R_2$ represents a member selected from the group consisting of hydrogen, an alkyl having up to 3 carbon atoms, halogen, phenyl, nitro substituted phenyl, and carboxyl; $R_3$ represents a member selected from the group consisting of hydrogen and halogen; $R_4$ represents a member selected from the group consisting of hydrogen and halogen, at least one of the substituents $R_3$ and $R_4$ always being a halogen.

2. The method according to claim 1 of promoting diuresis in mammals which comprises administering pharmacologically active dosages of a nuclear substituted cinnamic acid wherein both $R_3$ and $R_4$ are halogens.

3. The method of promoting diuresis in mammals which comprises administering to said mammals pharmacologically active dosages of 3,4-chloro cinnamic acid.

4. An article comprising a water soluble coating composition selected from the group consisting of ingestible synthetic gum and gelatin enclosing pharmacologically active dosage of between about 13 mgs. and 1.5 grams of a powdered compound of the formula

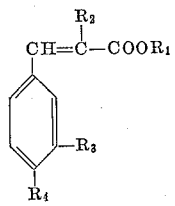

wherein $R_1$ represents a member selected from the group consisting of hydrogen, sodium and potassium; $R_2$ represents a member selected from the group consisting of hydrogen, an alkyl having up to 3 carbon atoms, halogen, phenyl, nitro substituted phenyl, and carboxyl; $R_3$ represents a member selected from the group consisting of hydrogen and halogen; $R_4$ represents a member selected from the group consitsing of hydrogen and halogen, at least one of the substituents $R_3$ and $R_4$ always being a halogen.

5. An article comprising a water soluble encapsulating material enclosing pharmacologically active dosage of between about 13 mgs. and 1.5 grams of a solution of a compound of the formula

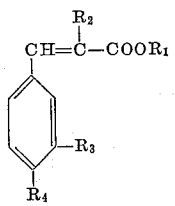

wherein $R_1$ represents a member selected from the group consisting of hydrogen, sodium and potassium; $R_2$ represents a member selected from the group consisting of hydrogen, an alkyl having up to 3 carbon atoms, halogen, phenyl, nitro substituted phenyl, and carboxyl; $R_3$ represents a member selected from the group consisting of hydrogen and halogen; $R_4$ represents a member selected from the group consisting of hydrogen and halogen, at least one of the substituents $R_3$ and $R_4$ always being a halogen.

6. An article comprising a water soluble encapsulating material enclosing pharmacologically active dosage of between about 13 mgs, and 1.5 grams of a vegetable oil solution of a compound of the formula

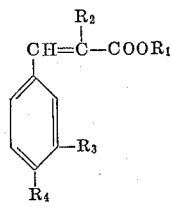

wherein $R_1$ represents a member selected from the group consisting of hydrogen, sodium and potassium; $R_2$ represents a member selected from the group consisting of hydrogen, an alkyl having up to 3 carbon atoms, halogen, phenyl, nitro substituted phenyl, and carboxyl; $R_3$ represents a member selected from the group consisting of hydrogen and halogen; $R_4$ represents a member selected from the group consisting of hydrogen and halogen, at least one of the substituents $R_3$ and $R_4$ always being a halogen.

7. The method of promoting diuresis in mammals which comprises administering to said mammals pharmacologically active dosages of the potassium salt of 3,4-dichloro cinnamic acid.

8. The method of promoting diuresis in mammals which comprises administering to said mammals pharmacologically active dosages of the potassium salt of 3,4-dichloro-alpha methyl cinnamic acid.

9. The method of promoting diuresis in mammals which comprises administering to said mammals pharmacologically active dosages of alph-p-nitrophenyl-trans-3,4-dichloro cinnamic acid.

References Cited

UNITED STATES PATENTS 2,858,314  10/1958  Georgian.
2,969,372  1/1961  Braun et al.

OTHER REFERENCES

Chemical Abstracts, vol. 58, entry 14598c, 1963, citing Barre et al., Compt. Rend. Soc. Biol., 1956 1807–9 (1962).

LEWIS GOTTS, *Primary Examiner.*

ELBERT L. ROBERTS, *Examiner.*

R. L. HUFF, *Assistant Examiner.*

UNITED STATES PATENT OFFICE

CERTIFICATE OF CORRECTION

Patent No. 3,345,263             October 3, 1967

Anangur V. Subbaratnam

It is hereby certified that error appears in the above numbered patent requiring correction and that the said Letters Patent should read as corrected below.

Column 3, line 13, strike out "forth", second occurrence; line 39, for "211°" read -- 221° --; column 4, line 11, for "precipitate" read -- precipitates --.

Signed and sealed this 22nd day of October 1968.

(SEAL)
Attest:

Edward M. Fletcher, Jr.
Attesting Officer

EDWARD J. BRENNER
Commissioner of Patents